Figure 5:
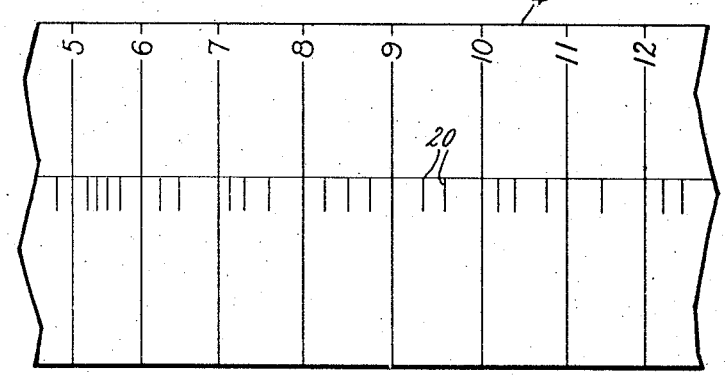

C. H. INGALLS.
RECORDING ELECTRIC METER.
APPLICATION FILED AUG. 12, 1910.
1,106,710.
Patented Aug. 11, 1914.
3 SHEETS—SHEET 1.
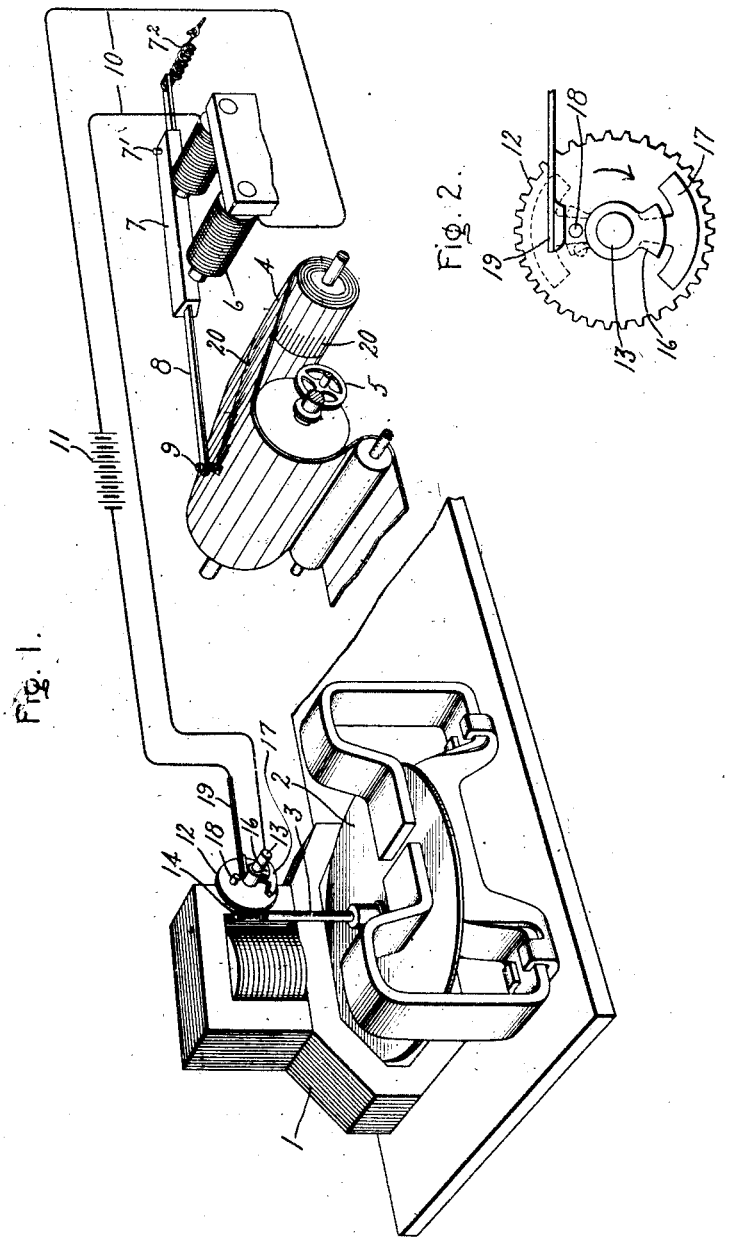
Witnesses:
George W. Tilden
J. Ellen Eber
Inventor:
Charles H. Ingalls,
by
His Attorney.

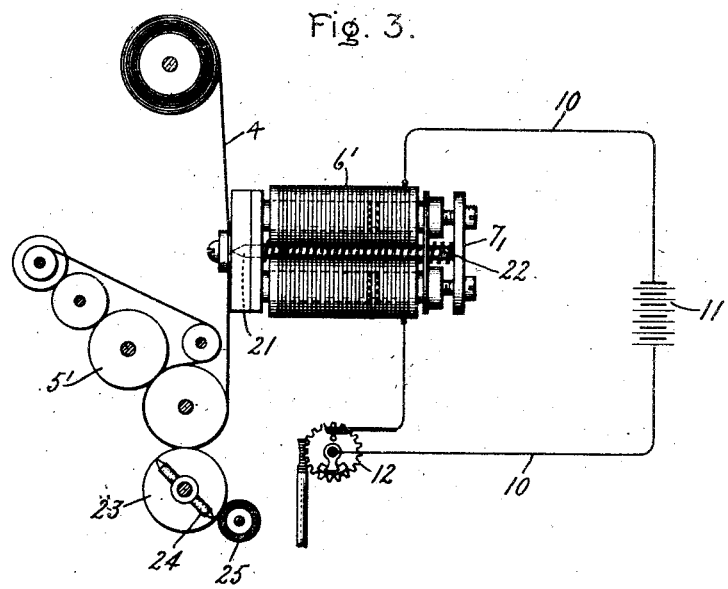
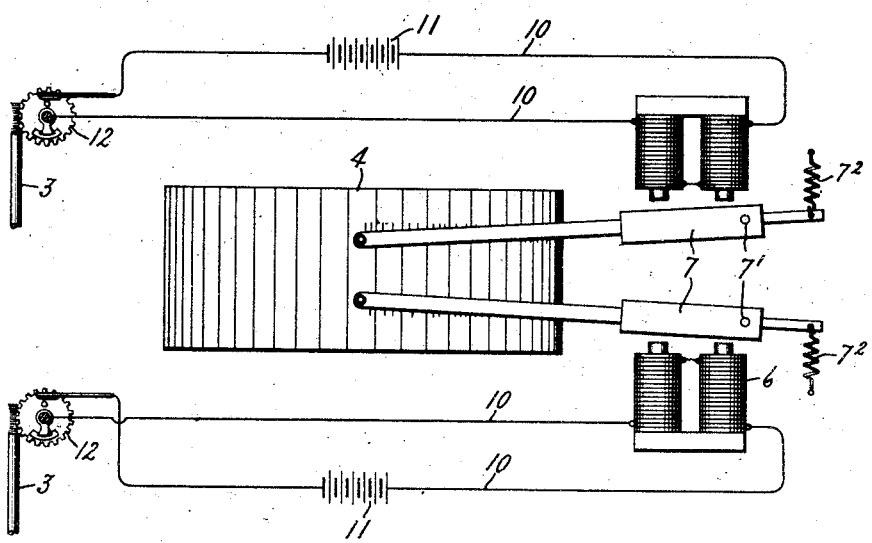

C. H. INGALLS.
RECORDING ELECTRIC METER.
APPLICATION FILED AUG. 12, 1910.

1,106,710.

Patented Aug. 11, 1914.
3 SHEETS—SHEET 3.

Witnesses:
George W. Tilden
J. Ellis Glen

Inventor:
Charles H. Ingalls,
by Albert G. Davis
His Attorney.

UNITED STATES PATENT OFFICE.

CHARLES H. INGALLS, OF DANVERS, MASSACHUSETTS, ASSIGNOR TO GENERAL ELECTRIC COMPANY, A CORPORATION OF NEW YORK.

RECORDING ELECTRIC METER.

1,106,710.          Specification of Letters Patent.      Patented Aug. 11, 1914.

Application filed August 12, 1910. Serial No. 576,898.

*To all whom it may concern:*

Be it known that I, CHARLES H. INGALLS, a citizen of the United States, residing at Danvers, county of Essex, State of Massachusetts, have invented certain new and useful Improvements in Recording Electric Meters, of which the following is a specification.

My invention relates to recording electric meters and has for its object an improvement in such devices.

Recording electric meters, as usually constructed, are complicated and special forms of mechanism, and one object of my invention is the construction of a simple and cheap recording electric meter.

A further object of my invention is the construction of a meter of such a character that the registering portion thereof may be used with any of the well known or standard forms of integrating meters.

I accomplish the object of my invention by employing as the meter element any well known form of integrating meter having a revolving shaft. The recording device consists of a record sheet driven at a uniform speed by means of suitable clockwork or marked at uniform time intervals by a suitable time actuated marking device. In operative relation with this record sheet is a suitable marker actuated by an electromagnet in such a manner that, when the circuit of the electro-magnet is closed, this marking device will make a mark upon the record sheet. The circuit for the electromagnet is closed by a specially made contact device attached to the shaft of the meter in such a way that, after a predetermined number of revolutions of the meter shaft, this circuit will be momentarily closed and a mark made upon the record sheet.

The employment of devices for recording the number of revolutions of a revolving shaft or the number of operations of a machine by means of a marker or pointer which makes a mark upon a time actuated record sheet after a number of revolutions of the shaft or operations of the machine is well known as is shown in Patents Nos. 831,030, S. S. Berry, and 792,680, C. F. Taylor *et al.*, but I am not aware that such devices have ever been used in connection with recording electric meters in such a fashion that a standard integrating electric meter may be readily converted into a recording electric meter.

For a further understanding of my invention reference may be had to the accompanying drawings where—

Figure 6:
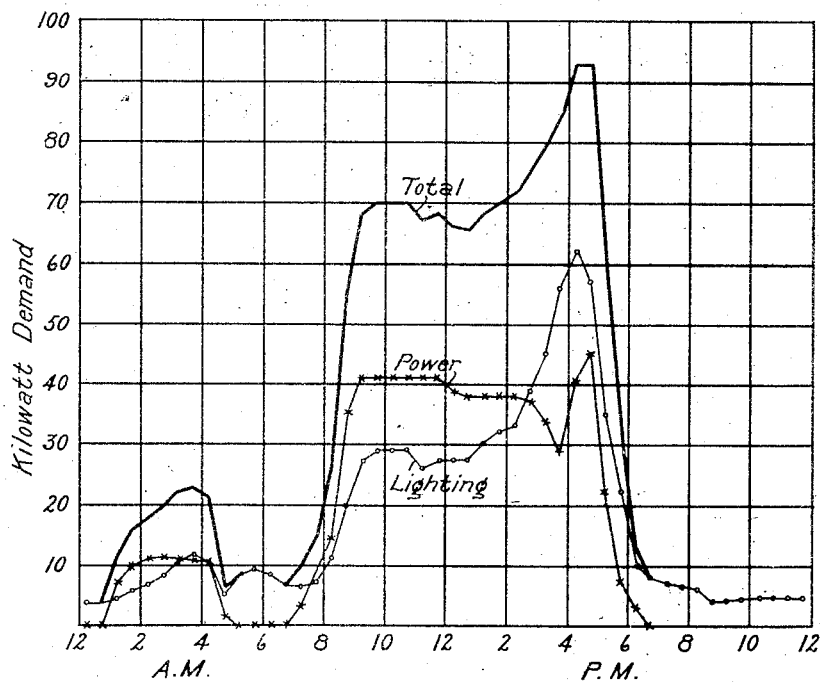

Figure 1 shows in perspective the main features of my invention; Fig. 2 shows a detail of construction of the same; Figs. 3 and 4 show various modifications of my invention; Fig. 5 shows a record produced by the meter, and Fig. 6 shows curves to illustrate the application of my invention.

Referring first to Fig. 1, I have shown a meter element 1, having a revolving disk armature 2 attached to the revolving shaft 3. I have diagrammatically illustrated the meter element as an integrating induction watt hour meter, such as is shown by Patent No. 835,321, W. H. Pratt, but I do not limit myself to any special form of integrating electric meter as my invention is applicable to any form of meter having a revolving shaft. 4 is the time actuated record sheet which may be driven in any suitable manner by a clockwork 5 in such a way that it will be moved forward at a uniform rate of speed. As such sheets and the driving mechanism thereof are well known, I have not fully illustrated the clock mechanism and the rolls upon which such sheet is wound. 6 is an electro-magnet, in operative relation with which is a magnetic armature 7 pivoted by a pivot 7' in such a way that it may swing toward the poles of the electro-magnet and be restrained by a spring 7² in such a manner that it shall normally be some distance from the magnet poles. Attached to the armature is an arm 8 at the end of which is a pencil or marker 9. Conductors 10 form a circuit for energizing the electro-magnet, and, embraced in this circuit, is a suitable source of energy 11. In operative relation with the shaft of the meter element is a worm wheel 12 fastened to a shaft 13. This wheel is driven by the worm 14 formed on the end of the shaft of the meter element. This may be the worm usually employed to drive the registering trains of such elements, or, if desired, the registering train may be used, and a special worm employed, and I have not considered it necessary to illustrate this. Loosely mounted on shaft 13 is a contact device 16 attached to a counterweight 17. Fastened to wheel 12 is a pin 18. This pin in revolving, for example in the direction shown by the arrow, pushes against counterweight 17 and moves the counterweight with it until the counterweight and contact are in an approximately vertical position, as shown in dotted lines in Fig. 2. Immediately after the vertical position is reached, owing to the action of gravity, the counterweight will fall and carry with it contact 16, thus causing movable contact 16 to momentarily make contact with the stationary spring contact bar 19. As may be seen from Fig. 1, this momentarily closes the energizing circuit for the electro-magnet. When the circuit is closed and the magnet energized, it will draw the armature 7 toward the poles of the magnet and thus cause the marker 9 to make marks 20 on the record sheet.

The principle upon which my invention works is as follows: The worm wheel 12 is driven directly from the meter element shaft by means of worm 14 and thus the number of revolutions which this wheel makes will be directly proportional to the number of revolutions made by the meter shaft. For each revolution of the worm wheel 12, the contact device will energize the circuit of the electro-magnet so that the marker will make one mark upon the record sheet. The number of marks which will be made upon the record sheet for a unit of time will hence depend upon the rapidity of revolution of the meter shaft. I have illustrated my invention as applied to a standard integrating watt hour meter. In such a meter each revolution of the shaft is the equivalent of a certain fixed value in watt hours, depending upon the meter in question. Since the number of revolutions of the worm wheel 12 is directly proportional to the number of revolutions of the meter shaft, it is obvious that the marker will make a mark upon the record sheet after a certain predetermined number of revolutions of the meter armature or after a certain fixed value in watt hours, this value depending upon the meter used and upon the relation between the number of revolutions of the worm wheel 12 and the meter shaft. The value of the spaces, therefore, between any two adjacent marks upon the record sheet will correspond to a certain number of watt hours, and, from the record produced, as shown in Fig. 5, the short lines 20 being the marks made by the marker and the long lines representing suitable time intervals, such as hours, for example, the total energy used in a given period of time and the average demand or use for the same period may be readily computed.

Referring now to Fig. 3, I have shown a modification of my invention. This modification consists in the employment of an electric punch to perforate or mark the record sheet instead of the marker shown in Fig. 1. This electric punch consists of electromagnet 6' which when energized attracts armature 7$^1$. Attached to this armature is a bar or rod 21 which terminates in a point, as shown, and which is normally held by means of spring 22 out of contact with the record sheet 4. When the electro-magnet is energized by means of the contact magnet device attached to the meter shaft in the manner previously explained, armature 7$^1$ will be attracted toward the poles of the magnet, which will cause the rod 21 to perforate a hole in the record sheet. It will be obvious that these holes will represent the number of watt hours indicated by the meter. In addition to the modifications of the marking means, I have also shown a slightly different arrangement of the time actuated record sheet. This modification consists in driving this sheet by suitable clockwork and rolls 5', these being diagrammatically illustrated, and, in addition thereto, employing a time actuated wheel 23 which is attached to a marker 24 in such a manner that, as wheel 23 is driven by the clockwork, the marker when it comes in contact with the record sheet will make a mark thereon at predetermined time intervals. The point of marker 24 touches against the ink roller 25 before coming in contact with the sheet in order that it may mark the sheet.

In Fig. 4, I have shown a still further modification of my invention. This modification consists in employing a plurality of meter elements, each having its recording mechanism and all arranged to mark a single time actuated record sheet. While I have illustrated two meter elements with the recording device shown in Fig. 1, it is obvious that any desired number of meter elements may be used or the modification of my invention shown in Fig. 3. The advantages of this modification are that, if, for example, it is desired to determine the demand on a number of circuits operating simultaneously, this may be done by connecting a meter to each circuit whose demand it is desired to measure and arranging the recording portions of the meter elements in the manner shown upon one record sheet. Thus an accurate registration of the demand in the circuits may be readily and easily obtained. As illustrating the advantages of this modification, I have shown in Fig. 6 a curve sheet showing the demand for two circuits, the one supplying power and the other being a lighting circuit, and the total demand computed from the addition of these two curves. Such a record may be obtained from the modification of my invention shown in Fig. 4 and additional curves may be obtained, as explained above, by the employment of additional meters.

It will be further obvious that the recording portion of my meter may be readily applied to standard meters of various capacities and voltages and to meters operating with direct or alternating current, and further, by the substitution of worm wheels of various sizes, the record obtained my be varied to suit all conditions. Furthermore, it will be obvious that the registering portion of my meter need not be closely adjacent to the meter but may be placed in any desirable locality and as far from the meter as may be desired.

While I have illustrated preferred embodiments of my invention, I do not limit myself to these embodiments but seek in the appended claims to cover all embodiments which will be obvious to those skilled in the art and will not depart from the spirit of my invention.

What I claim as new, and desire to secure by Letters Patent of the United States, is:—

1. A recording electric meter comprising a rotatable meter shaft, an electric circuit, means coöperating with said shaft for effecting a change in the electrical condition of said circuit at intervals of equal quantities of metered energy, and means in operative relation with said circuit for recording the times during which said equal quantities of energy are metered.

2. A recording electric meter comprising a rotatable meter shaft, an electric circuit, a contact circuit-closer adapted to be operated by said rotatable shaft at intervals of equal quantities of metered energy, a time-actuated record sheet, and means in operative relation with said electric circuit for recording said intervals on said record sheet.

3. A recording electric meter comprising a rotatable meter shaft, an electric circuit, a contact-closing device in said circuit, means in operative relation with said rotatable shaft for operating said contact-closing device at intervals of equal quantities of metered energy, an electromagnet in said electric circuit, a time-actuated record sheet, and means operated by said electro-magnet for recording said intervals on said record sheet.

4. A recording electric meter comprising a rotatable meter shaft, an electric circuit, a contact-closing device for said circuit consisting of a rotatable disk having a pin, means for rotating said disk by said meter shaft, a stationary contact-member and a movable contact-member in operative relation therewith, said movable contact-member lying in the path of said pin and adapted to be rotated in a forward direction by the pin for a portion of the contact-member's travel and by the action of gravity for the remaining portion of the contact-member's travel and to momentarily engage the stationary contact-member during said travel, a time-actuated record sheet, an electromagnet in said circuit, and means actuated by said electromagnet for recording on said record sheet the engagement of said contact-members.

In witness whereof, I have hereunto set my hand this eighth day of August, 1910.

CHARLES H. INGALLS.

Witnesses:
GEORGE B. SEARS,
JENNIE W. SEARS.